United States Patent
Rakov et al.

(10) Patent No.: US 7,282,878 B1
(45) Date of Patent: Oct. 16, 2007

(54) SYSTEMS FOR BRUSHLESS DC ELECTRICAL DRIVE CONTROL

(76) Inventors: Mikhail A. Rakov, 150 Alma St., #215, Menlo Park, CA (US) 94025; Tim Shinano, 19901 Septo St., Chatsworth, CA (US) 91311; Sergey Solomin, 17021 NE. 105th St., Redmond, WA (US) 98052

(*) Notice: Subject to any disclaimer, the term of this patent is extended or adjusted under 35 U.S.C. 154(b) by 47 days.

(21) Appl. No.: 11/413,420

(22) Filed: Apr. 28, 2006

(51) Int. Cl.
 *H02P 1/18* (2006.01)
(52) U.S. Cl. ............ 318/254; 318/138; 318/439; 318/700
(58) Field of Classification Search .......... 318/254, 318/138, 439, 721, 700, 722
See application file for complete search history.

(56) References Cited

U.S. PATENT DOCUMENTS

| 5,384,527 | A | * | 1/1995 | Rozman et al. ............ 322/10 |
| 5,872,408 | A |   | 2/1999 | Rakov |
| 5,914,578 | A |   | 6/1999 | Rakov |
| 6,101,084 | A |   | 8/2000 | Rakov |
| 6,140,793 | A |   | 10/2000 | Carr et al. |
| 6,525,506 | B2 | * | 2/2003 | Jin ............ 318/801 |
| 2002/0171381 | A1 | * | 11/2002 | Miyazaki et al. ........ 318/254 |
| 2004/0155613 | A1 | * | 8/2004 | Sugiyama et al. ....... 318/254 |

* cited by examiner

*Primary Examiner*—Rina Duda
(74) *Attorney, Agent, or Firm*—Townsend and Townsend and Crew LLP

(57) ABSTRACT

A controller for brushless DC motors includes an angular position sensor and control logic to detect the phase difference between a target position signal and a current angular position signal. The detected phase difference is the basis for generating motor drive control signals to position the rotor of the motor to the target position.

23 Claims, 10 Drawing Sheets

·············· Phase A
— — — Phase B
—·—·—·— Phase C

US 7,282,878 B1

SYSTEMS FOR BRUSHLESS DC ELECTRICAL DRIVE CONTROL

BACKGROUND OF THE INVENTION

The present invention relates generally to DC brushless electrical drives, and more specifically to controlling such electrical drives.

Improving the efficiency and technical characteristics in the control of electrical drives is of great importance in modern industry. Electrical drives of different types are ubiquitous in factories, laboratories, offices, in private homes, and in private and public transportation. Global production of electrical motors is estimated in several millions per day. Such enormous use of electrical motors underscores the need for effective control of electrical drives.

Control of electrical drives begins by determining the rotor position and speed. There are numerous information technologies and practical systems for controlling electromechanical devices, and specifically electrical motors of different construction. The basic differences between these systems stem from the chosen information parameter and corresponding sensor. First, the position of the rotor may be determined by an array of phototransistors and a special shutter coupled to the rotor shaft, or by using encoders, Hall-effect sensors, potentiometers, resolvers etc. Second, the speed signal may be obtained by using a small permanent magnet tachometer generator attached to the drive, or by using magnetic or optical sensors that generate pulses for each angular increment of the rotor. Third, a resolver may determine the position of the rotor by a two-phase (sine/cosine) signal at a carrier frequency that is modulated sinusoidally by the rotation of the rotor. However, all these methods have many disadvantages, such as the inability to determine the position of the rotor with high accuracy, the necessity to use different sensors with all auxiliary systems enabling their operation, the lack of a unified approach to the rotor position and speed determining, and the like.

BRIEF SUMMARY OF THE INVENTION

The present invention provides a controller for a brushless DC motor and motor systems where rotor position is controlled using a feedback configuration. The current rotor position is compared against a target rotor position in order to produce plural drive signals. The drive signals are applied to the motor to energize respective phase windings (i.e., stator magnetic poles, or pairs of poles) of the motor. In one aspect of the present invention, the drive signals are formed in such a way that a torque exerted by one phase against the rotor is counterbalanced by a torque exerted by at least another phase against the rotor.

BRIEF DESCRIPTION OF THE DRAWINGS

Aspects, advantages and novel features of the present invention will become apparent from the following description of the invention presented in conjunction with the accompanying drawings, wherein.

DETAILED DESCRIPTION OF THE INVENTION

In the present invention, we disclose the use of an information parameter that will radically change the art of controlling brushless DC electrical motors, and specifically variable reluctance (VR) brushless electrical drives. The parameter is the phase of the periodic electrical signals. Using phase as an information parameter to control electrical drives was generally described in U.S. Pat. No. 5,914,578 entitled "Method and Systems for Electrical Drive Control," by M. Rakov, fully incorporated herein by reference for all purposes. In the present invention, we focus on the control of a specific class of electrical motors, namely, brushless DC motors, including permanent-magnet motors, variable reluctance (VR) motors, as well as hybrid DC motors.

The term "phase" is well established in both information theory/engineering and in electromechanical engineering disciplines, with quite difference meanings. The present invention uses both meanings. While the correct meaning can be obtained from the context of the discussion, the following convention will be adopted: $phase_s$ will be used to denote a phase difference between two periodic signals, while $phase_w$ will refer to "phase" in the context of a discussion of the stator coils (phase windings) of a motor.

Figure 1:
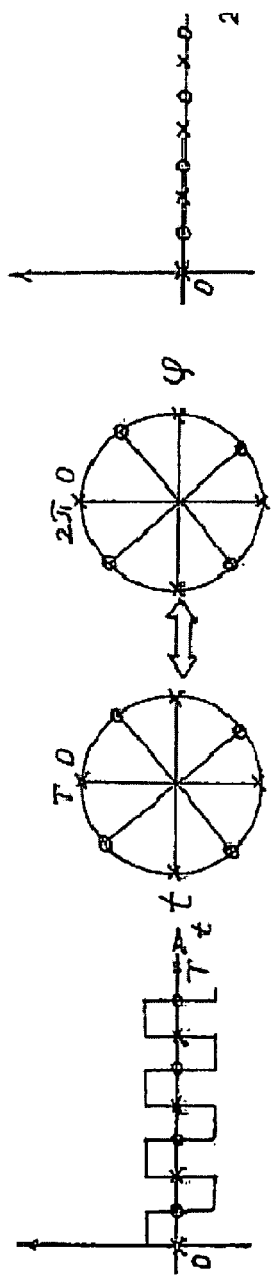
FIG. 1 is a diagram illustrating method of creating special points in a system by reproducing special points of basic (controlling) periodic signal.

Referring now to FIG. 1, there is shown method of creating special points in a control system by using basic periodical signal and $phase_s$ as an information parameter. There are several reasons why $phase_s$ presents special interest as an information parameter for the control of electromechanical systems, especially rotating electrical machines. First, there is complete congruence between points in the temporal dimension of a periodic process with period T and the positions of the rotor on the angular dimension of an electromechanical device. A more accurate description takes into consideration the simple relationship between the electrical angle $\phi_e$ and mechanical angle $\phi_m$:

$$\phi_e = N \times \phi_m,$$

where N is the number of magnetic pairs in the stator. In the above expression, $\phi_m$ is the relative angular position between the immobile parts and the moving parts of a machine (e.g., the stator and the rotor, respectively), while $\phi_e$ is an angle characterizing the current condition of the flux and other electromagnetic parameters. However, this elementary expression does not change the main fact: there is one-to-one correspondence between points on the axis of time t in temporal space for periodical process with the period T, and the points on the axis $\phi$ in the angular space with period $2\pi$. As it is evident from FIG. 1, both of these processes are essentially circular and reflect one another in a most simple and natural way.

Figure 2:
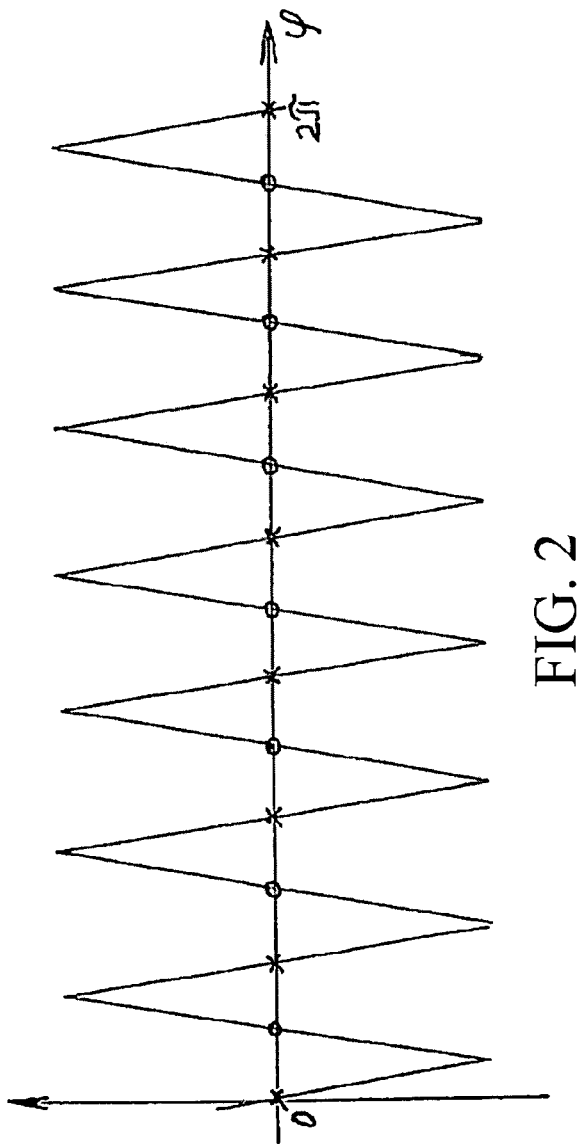
FIG. 2 is a diagram illustrating formation of stable and unstable points of equilibrium.

Referring now to FIG. 2, from this fact logically follows the second, which is very important in the creation of practical electromechanical devices, especially rotational ones. Namely, for a periodic process if we have some special points on the axis t, then we potentially can reproduce these points on the axis $\phi$.

Special points in a (binary) periodical process exist naturally. These are the points where the process changes values from 0 to 1 and from 1 to 0, or in terms of electricity, where the signal changes its sign from negative to positive and from positive to negative. By using these signals in the system with the phase$_s$-detecting link, we receive multiextremal characteristics, and by using a closed feedback loop we receive alternating stable and unstable points of equilibrium (FIG. 2). To change location of these points we have simply to change shape of controlling periodical process.

Let us discuss some fundamental concepts of information representation and processing. There are three main variants of representation of physical information signals:

in time (temporal)
in intensity (amplitude)
in space (spatial)

Beginning from the last, while robust and fast, spatial representation typically is complex to implement, and sometimes prohibitively complex as to be impractical. Here, to represent n states of a signal, one must have n independent signal lines, and with the increase of n, the complexity of the system achieves levels impossible to implement under given technical and technological constrains.

Representation of information using intensity (amplitude) of signals is much more economical in terms of the equipment required for implementation and typically can be implemented within a reasonable time. However, systems using amplitude representation of signals are not robust (with the obvious exception of binary systems). Numerous attempts to create systems of multiple-valued logic with amplitude representation, including attempts made by one of the authors of the present patent application, failed to reach positive results because of the vulnerability of such systems to errors and difficulties in controlling the accumulation of these errors.

Finally, a representation of information in time (i.e., using phase as an information parameter) allows one to create a system that is both simple to build and extremely robust. True, this variant of information representation and information processing is the slowest of all three basic options. However, for the control of electromechanical systems, where the period of controlling electronic/electrical signals is negligible compared to the time constant of the controlled devices themselves, this limitation is totally unimportant. Thus, the time approach readily eliminates the spatial and intensity variants as a potential competitors.

There are several more circumstances that make a time (and phase$_s$) representation the preferred representation among the three options listed above. Of all physical parameters, time t (as well as period T and its inverse, frequency f) present the highest metrological possibilities (i.e., are easiest to measure), exceeding those of, for example, amplitude by several decimal orders.

An interval of time can be fragmented into smaller intervals of time, or combined from smaller intervals of time, using the elementary, well understood, and highly reliable operation of pulse counting. Similarly, by operations of frequency transformation (division and/or multiplication) the whole spectrum of frequencies can be easily obtained, with the arbitrary (whole numbers, fractions or even non-coherent) relations between members of the set. This opens the possibility of creation of practical devices with highest accuracy and resolution, and also with high operational flexibility.

Transformation of the phase$_s$, time intervals, and frequency into other types of information parameters is also very simple and robust, both in analog and digital form. Transformation of phase$_s$ into amplitude can be performed by phase$_s$ detectors of different types, including ones with the output proportional to the phase$_s$ difference (shift). Phase$_s$ splitting can be performed by the same operation of frequency division using the fact that the naturally occurring phase$_s$ shift $\phi=2\pi$(i.e., 360°) transforms under this operation with coefficient of division K into a polyphase signal with several phase$_s$ shifts:

$$\phi' = i\frac{2\pi}{K}, i = 0, \ldots, K-1$$

Figure 3:
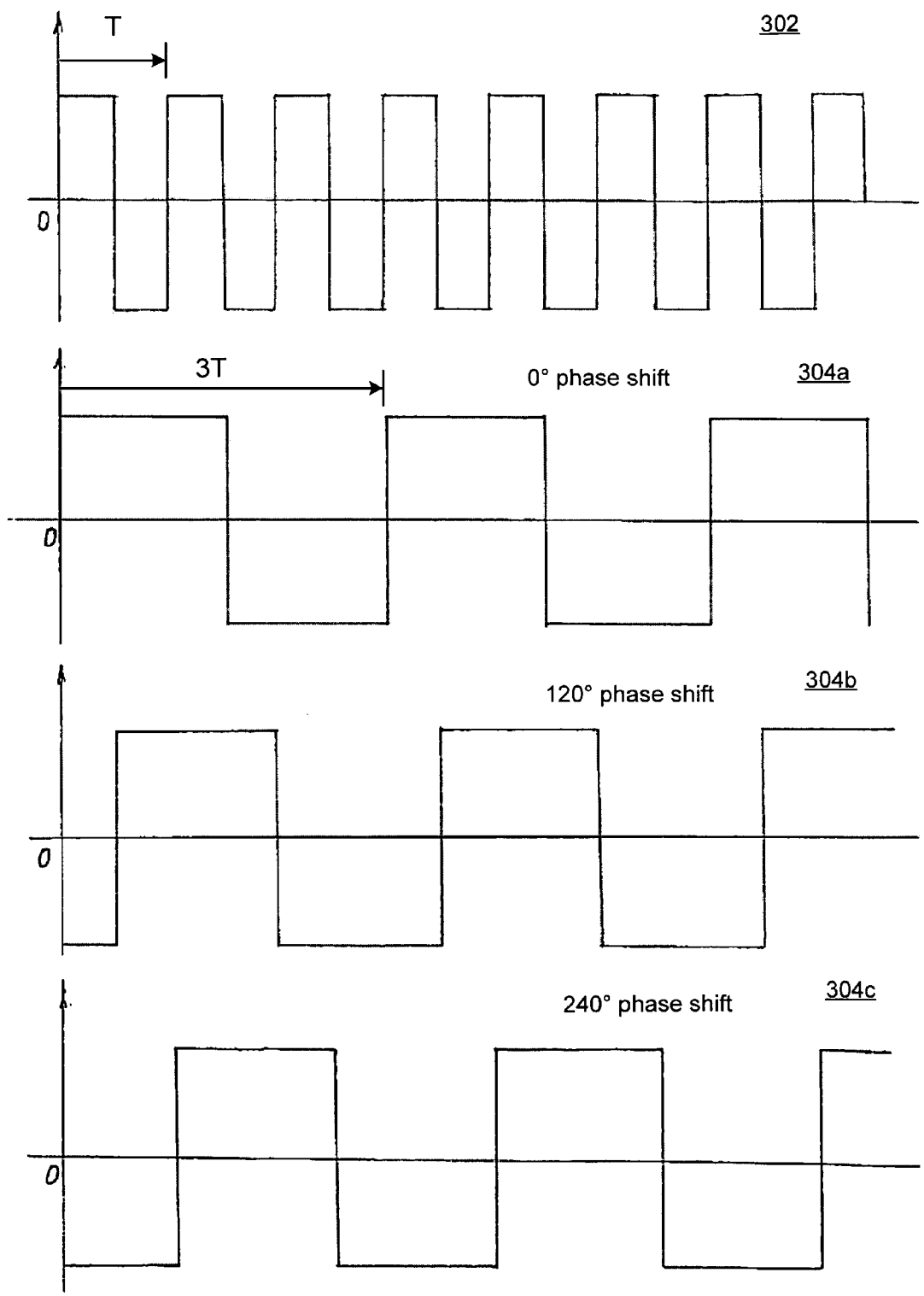
FIG. 3 is a diagram illustrating phase splitting using frequency division.

Referring to FIG. 3, corresponding waveforms are presented for the case K=3 and resulting phase$_s$ shifts of 0, $$\frac{2\pi}{3},$$

, and $$\frac{4\pi}{3}$$

(i.e., 0°, 120° and 240°). Here, by operation of frequency division, the initial period T of the basic signal 302 with frequency f is transformed into three signals 304a, 304b, 304c with period 3T and corresponding phase$_s$ shifts.

Frequency itself can be measured, again with the highest accuracy, depending on range, either by the speed of change of the phase$_s$ shift (in radians or degrees per unit of time), or by the number of transitions of the signal phase$_s$ through $2\pi$(360°). All this opens wide perspectives to use phase$_s$ as an information parameter in the automatic control systems for electromechanical devices of practically every imaginable type.

To expand, though not to exhaust the list of advantages of using phase$_s$ as an information parameter, we further note that the creation of various forms of periodic signals can be easily achieved using pulse-width modulation (PWM) and frequency modulation (FM) techniques. Besides easy transformation into amplitude, phase-represented information can also be easily transformed into spatial form using extremely simple and highly reliable devices; for example, switches.

Let us emphasize the main advantage of the method of creating points of equilibrium in electromechanical devices, and its principal difference from traditional approaches. Unlike fixed stable points determined by mechanical construction, these points of equilibrium are virtual; they can be created and re-created in any point of spatial domain simply by manipulating the location of special points in temporal domain. Systems using this principle will have the highest flexibility and totally new modes of operation.

To completely utilize these highly attractive advantages of a $phase_s$ representation of information, we need to have an adequate control system as well as simple and reliable $phase_s$ sensors. We need also to chose the most appropriate type of controlled motor.

There are two basic configurations of brushless DC motors: permanent magnet and variable reluctance. A third configuration referred to as a hybrid combines features of permanent magnet motors and variable reluctance motors.

The permanent magnet (PM) motor operates on the reaction between a permanent-magnet rotor and an electromagnetic field created by coil windings of a stator. When no power is applied to the windings, a small magnetic force is developed between the permanent magnet and the stator. This magnetic force is called a "detent torque." When a PM motor has a steady DC signal applied to one stator winding, the rotor will overcome the detent torque and line up with the stator field. The variable-reluctance (VR) motor differs from the PM motor in that it has no permanent-magnet rotor and no residual torque to hold the rotor at one position when turned off. The hybrid motor consists of two pieces of soft iron, as well as a round permanent-magnet rotor. The term hybrid is derived from the fact that the motor is operated under the combined principles of the permanent magnet and variable-reluctance motors. The stator core structure of a hybrid motor is essentially the same as that of a VR motor. The main difference is that in the VR motor, only one of the two coils of one $phase_w$ is wound on one pole, while a typical hybrid motor will have coils of two different $phases_w$ wound on the same pole.

VR motors offer advantages in terms of efficiency, power per unit weight and volume, robustness, and operational flexibility. Their reliability, as with any brushless motor, is largely due to the absence of a commutator and a brush. VR motors are competitive with other electrical drives. They offer a higher efficiency over a wide speed range as well as higher torque-to-volume ratio.

Control (and specifically positioning) of the brushless electrical motors presents some problems, but also opens very interesting and valuable possibilities. Unlike regular (brush) DC motors, which have two symmetrical and permanent points of force and torque application, a typical brushless motor has several (most commonly 3) alternating points of such application. This fact makes it necessary to change these points, and hence to activate the stator poles A, B, C alternatively, depending on the current and desirable position of the rotor.

Figure 12:
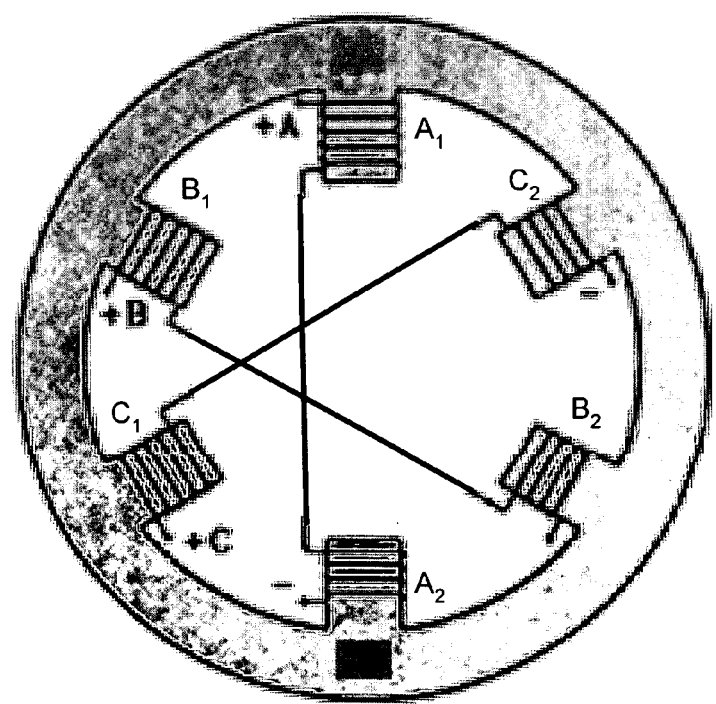
FIG. 12 is a cross-sectional view of a stator in a conventional variable reluctance (VR) brushless DC motor.

Referring to FIG. 12 for a moment, a discussion of various structures in a conventional brushless motor are shown. Though these structures are fundamental and well understood, this discussion is provided in order to introduce terminology used in the present application. As with any electrical motor, a brushless motor comprises a stator and a rotor. In the case of a brushless motor, the stator comprises the electromagnetic components of the motor, while the rotor may comprise permanent magnetic elements (in the case of a permanent magnetic motor), or in the case of a VR motor is of magnetic materials (ferromagnetic) that are not permanent magnets. The stator comprises a set of poles commonly referred to as "stator poles." A coil is wound around each pole, referred to as the "stator coils." When a current is passed through a stator coil the process is referred to as "energizing" the coil.

FIG. 12 is an example of a conventional six-pole stator for a variable reluctance-type (VR) motor. In a VR motor, the stator coils are energized in pairs, referred to as "$phases_w$." That is, for a given pair of coils, e.g., coils $A_1$ and $A_2$, the same current signal (drive signal) is passed through both coils of the $phase_w$. The six poles are paired off into three $phases_w$, A, B, and C, and each pair of coils is referred to as the phase coil. FIG. 12 shows a three-phase stator for a VR motor. Thus, the $phase_w$ A comprises coils $A_1$ and $A_2$, $phase_w$ B comprising coils $B_1$ and $B_2$, and $phase_w$ C comprising coils $C_1$ and $C_2$. The coils of a $phase_w$ are connected so that the same current passes through both coils, i.e., entering at the terminal of one coil of and exiting at the terminal of the other coil. It will be noted that the term "phase winding" refers to the stator coils comprising the $phase_w$. For example, the phase winding for $phase_w$ A comprised stator coils $A_1$ and $A_2$.

Figure 13:
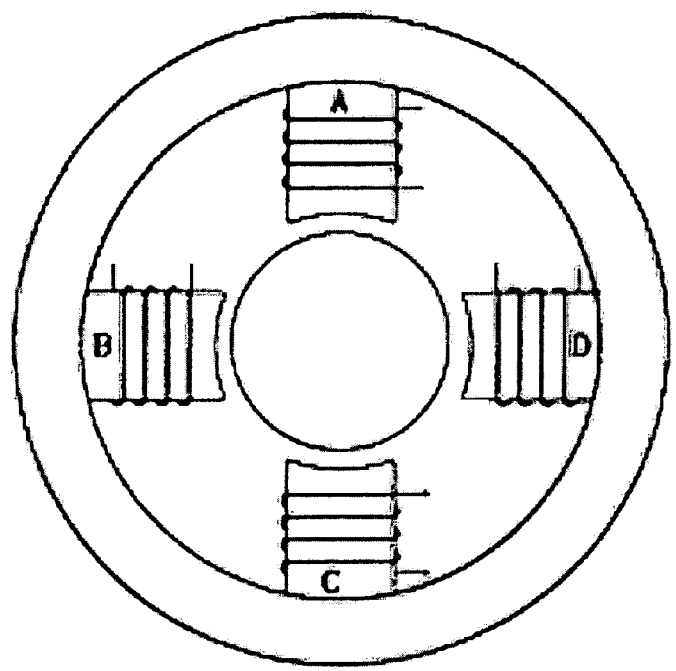
FIG. 13 is a cross-sectional view of a stator in a conventional permanent magnet (PM) brushless DC motor.

FIG. 13 shows a conventional four-pole stator for a permanent magnet-type motor. Here, the constituent stator coils are not connected as they are in a VR motor. Instead, each stator coil is energized by a different current signal (drive signal). The term "phase winding" is also used to refer to the stator coil of a permanent magnet brushless motor. In the example shown in FIG. 13, the stator would be for a four-phase permanent magnet brushless DC motor.

Figure 14:
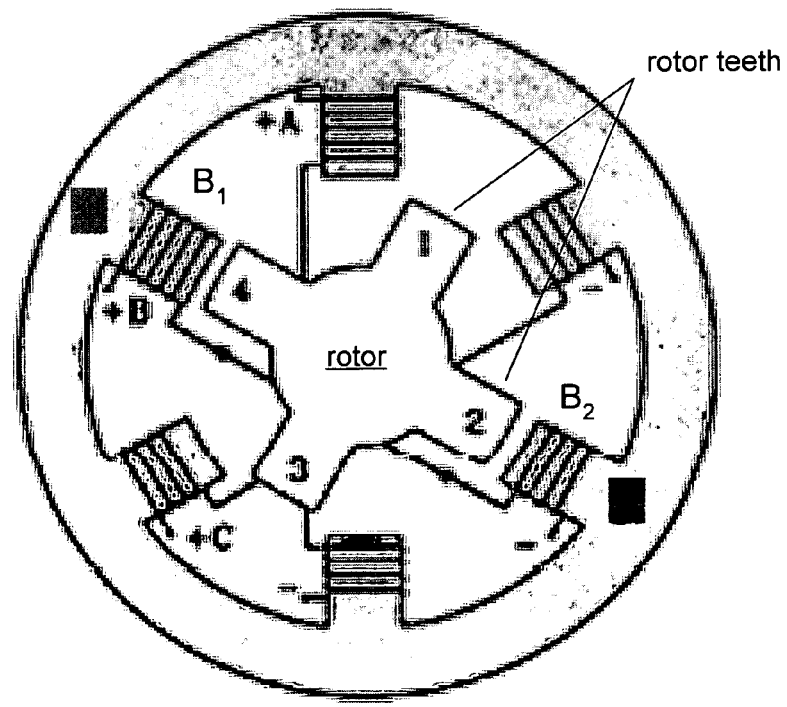
FIG. 14 is a cross-sectional view of a VR brushless motor.
Figure 15A:
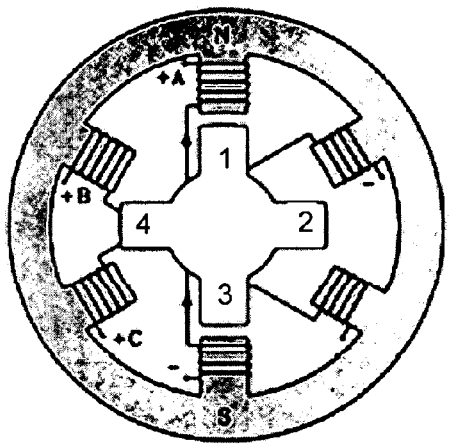
FIGS. 15A–15F is a sequence of rotor movements in a VR motor.
Figure 15B:
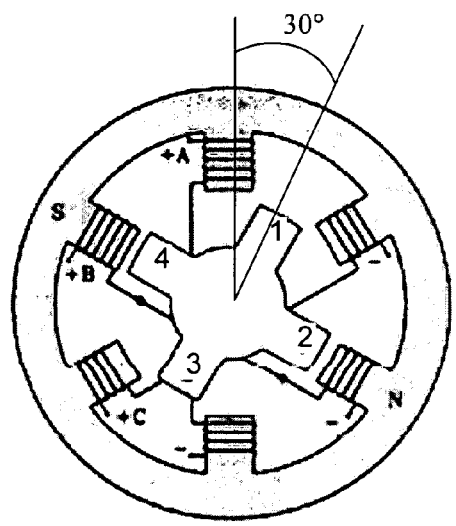
Figure 15C:
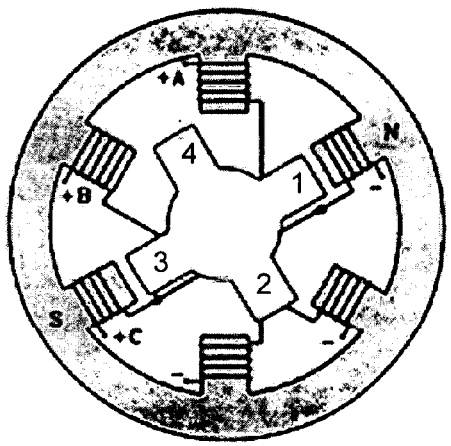
Figure 15D:
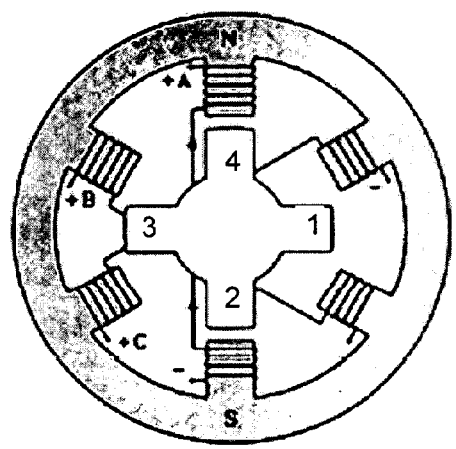
Figure 15E:
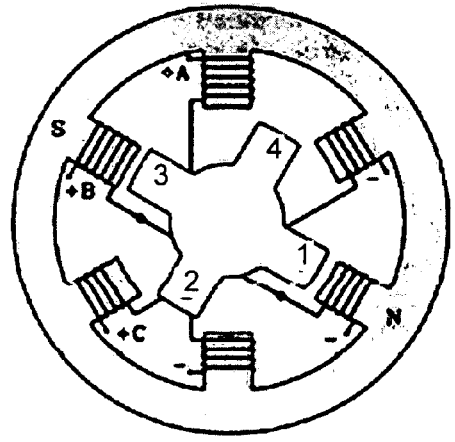
Figure 15F:
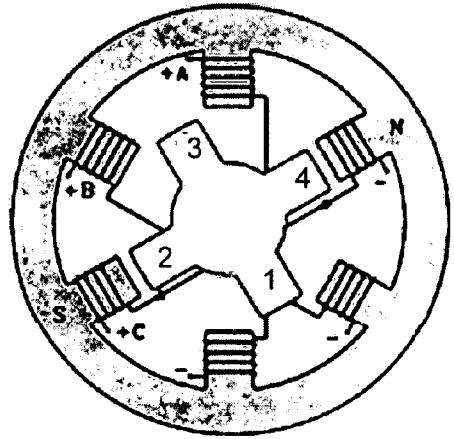

FIG. 14 is an example of a three-phase (six-pole) VR motor. The motor includes the stator shown in FIG. 12 and a rotor element. The rotor is of ferromagnetic material; e.g., soft steel. The rotor comprises a plurality of teeth, typically the number of rotor teeth is different from the number of stator poles. In operation, when a $phase_w$ is energized the rotor teeth will line up with the poles of the energized stator coils. FIG. 14 shows $phase_w$ B is energized, and so coils $B_1$ and $B_2$ are energized; the rotor teeth 4 and 2 are shown aligned respectively with the poles $B_1$ and $B_2$ of the energized coils. The motive force arises from the principle of minimizing the reluctance along the path of the magnetic field created by the energized $phase_w$ B. By alternating the $phases_w$ that are energized, the magnetic field (stator field) changes, and the rotor moves to a new position.

Typically two or more poles are simultaneously energized with different drive signals. Typically, a current in the form of square waves is used to energize the phase windings. The current in each phase winding is selectively pulsed ON and OFF to effect rotary motion. The sequence of waveforms shown in the table below shows pulse sequences for energizing the three $phases_w$ of the VR motor shown in FIG. 13 to make one complete rotation. FIGS. 15A–15F show the resulting sequence of rotations from the 0° position of the rotor to the 90° position. The "position" of the rotor is the angular displacement relative to some starting position, where the starting position is regarded as the 0° position.

| PHASE | | | |
|---|---|---|---|
| A | B | C | Position |
| ON | OFF | OFF | 0° |
| OFF | ON | OFF | 30° |
| OFF | OFF | ON | 60° |
| ON | OFF | OFF | 90° |
| OFF | ON | OFF | 120° |
| OFF | OFF | ON | 150° |
| ON | OFF | OFF | 180° |
| OFF | ON | OFF | 210° |
| OFF | OFF | ON | 240° |
| ON | OFF | OFF | 270° |
| OFF | ON | OFF | 300° |
| OFF | OFF | ON | 330° |
| ON | OFF | OFF | 360° |

With the foregoing basic terminology, we return now to our discussion. Following the general idea of the present invention, the angular space 2π(360°) of motor and time period T of controlling signals is divided into predetermined symmetric sectors (i.e., pre-defined positions of the rotor, rotor positions). For example, the rotor positions can be defined to be aligned with $phase_w$ A, B, or C, thus defining three positions at 120° spacings. As another example, the defined rotor positions can lie between stator coils; e.g., at 60° spacings: the position at $phase_w$ A, the position between $phase_w$ A&B, the position at $phase_w$ B, the position between $phase_w$ B&C, the position at $phase_w$ C, and the position between $phase_w$ C&A. As will be appreciated, still other angular positions of the rotor are possible. As will also be appreciated, any arbitrary rotary position can be achieved.

Control signals are applied to a corresponding pole or groups of poles depending on the current position of the rotor and a target position of the rotor. Each defined position is a point of equilibrium (stable state) where the resulting force and torque that act on the rotor are substantially equal to 0. The rotor will return back to the stable state in case of any deflection. Changing control signal changes the point of equilibrium (rotor position).

An additional problem arises from the fact that, unlike in the brush motors where the torque exerted on the rotor by the phase windings does not vary with angular position, VR drives have variable distribution of the (static) torque. Each $phase_w$ exerts torque on the rotor. As the rotor is driven, the torque exerted on the rotor is a combination of the torque exerted by each $phase_w$ that is energized. Therefore, in situations that require uniform torque additional processing in the controller is needed to compensate for torque variations.

Figure 4:
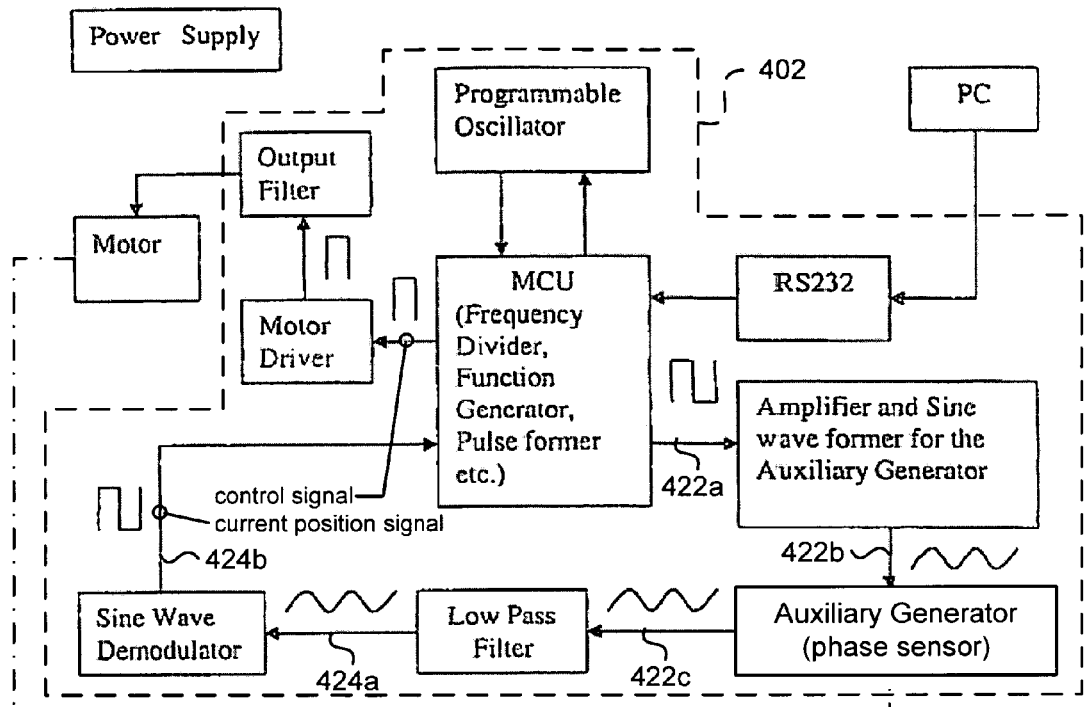
FIG. 4 is a block-diagram of an illustrative embodiment of a control system for brushless electrical drives control according to the present invention.

Referring now to FIG. 4, there is shown a block diagram showing an illustrative embodiment of a motor control system 402 in accordance with the present invention. The control system can be used to control a regular brush motor and different types of brushless motors. For generality, results of experiments are described below for some motors. First, the various components shown in FIG. 4 will be described:

Power Supply: This is a 5V DC power supply built on the LM2594 step-down "buck" switching regulator is capable of driving a 0.5A load with excellent line and load regulation. This part is manufactured and sold by National Semiconductor.

MCU: The control system is based on the P89C660HBA single chip microcontroller. Several modules such as Frequency Divider/Phase Splitter, Function Generator, and Pulse Former have been implemented as software routines, although other implementations are possible (e.g., hardware-only implementations, hardware/software implementations, and so on). In a particular embodiment, the embedded software has been written in the "Assembler" language using TASKING Embedded Development Environment (EDE) tools. The MCU is manufactured and sold by the Philips Corporation.

Programmable Oscillator: The Programmable Oscillator is based on the LTC6903 chip. The LTC6903 is a low-power self-contained digital frequency source providing a precision frequency from 1 kHz to 68 MHz, set through a serial port. This part is manufactured and sold by Linear Technology.

Phase Sensor/Auxiliary Generator: The Auxiliary Generator provides to the control unit a current position signal indicative of the present rotational position of its rotor. A 5V 3-phase synchro control transformer is used as an Auxiliary Generator. The output $phase_s$ shift is directly proportional to the angular position of the rotor of the Auxiliary Generator relative to its stator. In the embodiment shown, the Auxiliary Generator is a conventional $phase_s$ sensor. The particular component that was used had a nominal operating frequency of 400 Hz.

Electronic switch and Amplifier/Motor Driver: The electronic switch and the amplifier is based on the commercially available L6234 triple half bridge motor driver, that combines isolated DMOS power transistors with CMOS and Bipolar circuits on the same chip. The same component is used as the Auxiliary Generator Amplifier. This part is manufactured and sold by STMicroelectronics.

Output Filter: The Output Filter is a capacitive type filter.

Low Pass Filter: This is an 8th-order, switched-capacitor Low Pass Filter, based on the MAX294 component. The filter is designed with a 400 Hz corner frequency to eliminate higher harmonics. This part is manufactured and sold by Maxim Integrated Products.

Sine Wave Demodulator: The Sine Wave Demodulator is based on the MAX903 high-speed, low-power comparator with TTL logic output suitable for communicating with a logic device such as MCU. This part is manufactured and sold by Maxim Integrated Products.

Motor: To prove the concept a low-power DC brushed motor was used in the first stage of the design. Then, the brush motor was replaced with a BL29LR-STD DC brushless permanent magnetic motor (manufactured and sold by the Assignee of the present invention), and then with a LD11EAL-1 (Eastern Air Devices, Inc.) variable reluctance (VR) motor.

RS232: An RS232 communication module is provided to facilitate downloading the software. This module, or any other suitable communication interface, is useful for communication with a PC-based control system.

Next, operation of the controller (MCU) will be discussed.

The MCU provides a drive signal to the Motor via the Motor Driver and Output Filter, thus controlling the angular position of the Motor's rotor. Typically, the rotor of the motor and the rotor of the Auxiliary Generator are mechanically coupled. Although in FIG. 4 these components are depicted as separate elements for ease of illustration, a dashed line is shown to represent a coupling between the Motor and the Auxiliary Generator such that rotation of the Motor's rotor results in a corresponding rotation of the Auxiliary Generator (Phase Sensor) rotor.

When power is applied, the MCU sends a stream of data to the Programmable Oscillator to the oscillator's serial port to program its output frequency. In the disclosed embodiment, the output frequency may be calculated as N×400 Hz, where N is the position resolution, a value that can be set by a user; i.e., the rotor can be positioned in any of N positions. For example, if the number of steps N is 360 (for 1° resolution in movement), the Programmable Oscillator is programmed to produce a 144 KHz signal. As mentioned above, 400 Hz is a nominal operating frequency of the Auxiliary Generator. Other resolutions can be achieved by changing the frequency. For example, 2° resolution can be achieved with a 72 KHz signal. Higher resolutions such as 0.1° would use a 1.44 MHz signal, a 0.01° step resolution can be achieved with a 14.4 MHz signal, and a 0.001° step resolution can be achieved using a 144 MHz signal.

The MCU's Frequency Divider forms a 3-phase 400 Hz signal 422a, which is amplified by the Auxiliary Generator Amplifier. The amplified signal is modulated by the Sine Wave Former to produce a sinusoidal signal 422b used to drive the 3-phase primary windings of the Auxiliary Generator (Phase Sensor). The sinusoidal drive signal 422b is used to generate a signal that indicates the angular position of the rotor of the Auxiliary Generator with respect to a predetermined one of its phases$_w$ selected to be a point of reference. Since the Motor is rotationally coupled to the Auxiliary Generator, the signal generated by the Auxiliary Generator serves to indicate the current angular position oft the Motor's rotor.

Typically the sinusoidal signal 422b used to drive a phase$_w$ (e.g., phase$_w$ A) is 120° out of phase$_s$ relative to the signal driving an adjacent phase$_w$ (e.g., phase$_w$ B). Using phase$_w$ A as the reference position (or reference phase$_w$), for example, when the rotor of Auxiliary Generator (Phase Sensor) is aligned with the rotor, its output signal (also a sinusoidal signal) is in phase$_s$ with the signal that drives phase$_w$ A. When the rotor is rotated 90° in the clockwise direction, the output signal 422c will be 90° out of phase$_s$ with respect to the drive signal. Typically, the rotors of the Motor and the Auxiliary Generator are aligned. Thus, the angular position of the rotor of the Auxiliary Generator relative to the reference position is reflected by the phase$_s$ difference between the output signal 422c of the Auxiliary Generator (Phase Sensor) and the sinusoidal signal 422b.

In addition to the 3-phase signal 422a, the MCU generates an internal target position signal (not shown) having the same frequency as the 3-phase signal 422a but shifted in phases by an angle "φ" relative to the reference position (i.e., angular position relative to the location of phase$_w$ A) by the digital signal produced by the Programmable Oscillator. The angle "φ" is set by the user and represents the target position of the rotor, and the 3-phase signal 422a therefore represents a reference signal. The resolution of "φ" is thus determined by the frequency of the signal produced by the Programmable Oscillator. FIG. 4B shows that the position of phase winding A is the reference position, and that that the target position is measured relative to the reference position by the angle "φ". The output signal 422c from the Auxiliary Generator (Phase Sensor) is directly proportional to the angular position of its rotor relative to its stator, and as will be explained below controls the angular position of the rotor of the Motor relative to its stator.

Recall, that as the Motor turns, the rotor of the Auxiliary Generator rotates correspondingly. This rotation of the Auxiliary Generator produces an output signal 422c that is fed back via a feedback loop to the MCU in the following manner. The output signal 422c of the Auxiliary Generator feeds into the 8th-order Low-pass Filter. The filter provides sharp roll off and −80 dB of stopband rejection, thus producing a filtered sine wave output 424a. The filtered sine wave signal 424a is demodulated by the Sine Wave Demodulator to produce a corresponding square-wave signal having positive and negative going pulses, and is referred to as a current position signal 424b. This current position signal 424b is fed back to the MCU so the MCU can detect its negative transitions. The position of the Motor is therefore fed back to the MCU in the form of the current position signal 424b.

The negative transition of the phase$_s$ output signal 424b occurs every 2.5 mS (i.e., 400 Hz) and represents the current position of the rotor. When the MCU detects a negative transition (432, FIG. 4A) in the current position signal 424b, the MCU generates either a "Forward" or a "Reverse" control signal depending on the phase$_s$ relation between the target position signal and the current position signal. This control signal is amplified by the Electronic switch and Amplifier/Motor Driver, which is then filtered by the Output Filter, and then applied to the Motor, thus completing the feedback loop.

Figure 4A:
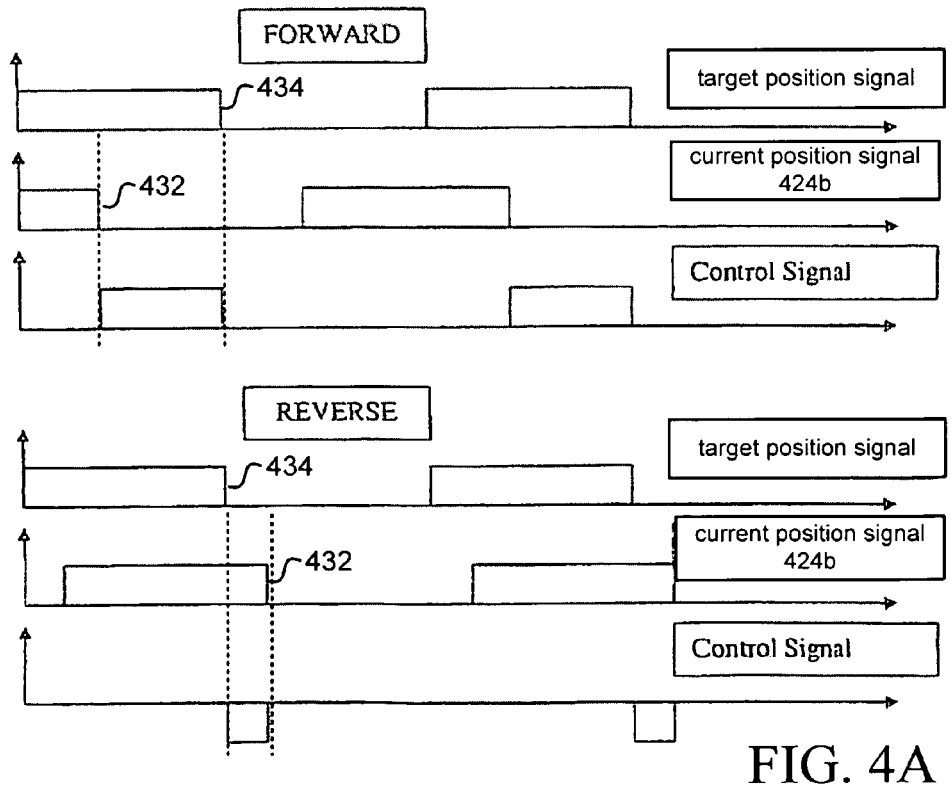
FIG. 4A shows the control signal waveforms.
Figure 4B:
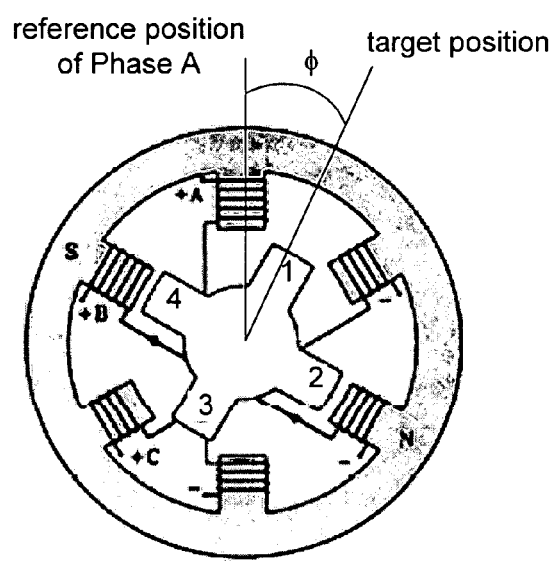
FIG. 4B illustrates the target position of the rotor.

A "Forward" control signal is generated when a negative transition of the current position signal 424b occurs and it leads the target position signal, as shown in FIG. 4A where the horizontal axis represents phase difference. The Forward control signal is asserted high to operate the motor in the forward rotational direction.

Also shown in FIG. 4A, a "Reverse" control signal is generated when a negative transition of the current position signal 424b occurs and it lags the target position signal. The Reverse control signal is asserted low to operate the motor in the reverse rotational direction.

The point of equilibrium occurs when the negative transition 432 of the current position signal and the negative transition 434 of the target position signal coincide in time; i.e., there is no phase difference between the current position signal and the target position signal.

Brushless Permanent Magnet DC Motor Embodiment

Unlike regular (brushed) DC motors with two symmetrical and permanent points of force application, a typical DC brushless motor can be configured with a combination of any number of stator phase windings and any number of rotor magnet pole pairs. In general, a larger number of phases$_w$ and poles results in better characteristics. However, cost and practical design constrains limit the design to manageable numbers. The BL29LR-STD DC brushless motor has a 3-phase stator (i.e., six stator coils) and a rotor with 4 magnet pole pairs. This kind of design creates points of detent; i.e., positions of equilibrium determined by the construction of the stator and the rotor resulting from the attractive forces between the rotor magnet and the energized coils. The number of points of detent can be calculated as 3×4, where 3 is a number of phases$_w$, and 4 is a number of poles.

The construction of a brushless permanent magnet DC motor necessitates a modification of the controller of FIG. 4 to include additional logic to switch between phases$_w$. This logic was implemented as software routines, and does not require the modification of the hardware components. Implementation of the logic (e.g., logic circuits, firmware, software, etc.) for switching between phases$_w$ is conventional and well understood and thus need not be further discussed.

For a particular implementation, the number of points of equilibrium was set to six (i.e., 60° intervals between equilibrium points). Though the target position could be attained, the position of the rotor was not stable. The permanent magnet of the rotor was observed to be moving (unstable) between two neighboring equilibrium points, causing the rotor to vibrate. Then, the position of the Auxiliary Generator (Phase Sensor) was manually adjusted, to align the rotors so the point of equilibrium was symmetrically located between detent points of the motor. The vibration was eliminated at any of the six positions. The number of points of equilibrium was increased to 12 (30° interval between the points). The operation of the motor was stable when a point of equilibrium fell in between two mechanical points. Once the Auxiliary Generator (Phase Sensor) was manually shifted to a side, the system became misbalanced, and the rotor began to vibrate. The highest vibration was observed when a point of equilibrium was set close to a mechanical point. When the number of points of equilibrium was increased to 24, the position of the rotor was stable in 12 points symmetrically located between mechanical points. To overcome vibration, the duration of the control signal was significantly reduced, so the output capacitor would store just enough energy to move the rotor to a point of equilibrium. This approach has reduced vibration.

Generally, the creation of stable states in accordance with the present invention is correct and will result in working devices. A motor controller according to the present invention needs no modification to control brushed DC motors. The number of points of equilibrium can be significantly increased so a motor will be able to work in the microstepping mode. Motors with intrinsic stable states determined by their construction, such as brushless DC motors with permanent magnets present some technical limitations in implementation of this method.

An advantage of brushless motors in terms of reliability and absence of commutator and brush maintenance applies not only to permanent-magnet motors but extends equally to a class of motors having no permanent magnets on the rotor. As noted above this class of motors is known as the variable reluctance (VR) or switched reluctance (SR) motor. The construction of the VR motors is very similar to the construction of the brushless DC motors with permanent magnet. The major difference is that VR motors do not have a permanent magnet in their magnetic circuit. The proven concept of creating of stable states suggests that this method will be suitable for controlling brushless DC motors with no mechanical points of detent, such as variable reluctance motors.

Variable Reluctance Motor Embodiment

Figure 5A:
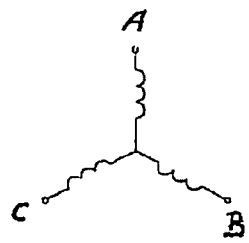
FIGS. 5A and 5B show two different electrical connection arrangements between the windings (coils) in a three-phase variable reluctance electrical motor.
Figure 5B:
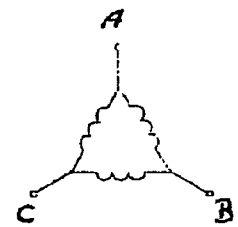

A cross-sectional view of a VR brushless electrical motor with six stator poles and four rotor poles, having three phase windings A, B, and C is presented in FIG. 12. FIGS. 5A and 5B present star ("wye") and delta connections, respectively, of the three phase windings of a 3-phase VR motor.

Since variable reluctance (VR) and brushless motors with permanent magnets are very similar, the controller requires only minor changes. The NMB BL29LR-STD DC brushless permanent magnetic motor has been replaced with the LD11EAL-1 variable reluctance (VR) motor. The LD11EAL-1 is a 3-phase, 28V DC 0.35A motor, with a 15° step. The fact that this motor does not have points of detent initially did not completely eliminate the vibration effect near when the rotor was near the phases$_w$, as observed with the permanent magnet (PM) brushless motor. Just like with the PM brushless motor the stable point of equilibrium could be achieved only at times where the rotor was symmetrically located between two phases$_w$. This observation suggested that the points of detent present in a PM brushless motor are not the sole reason for the unstable behavior of the motor. Further experiments revealed that the observed unstable operation in the VR motor configuration was caused by nonlinear torque distribution. Thus instability can be observed in VR motors as well and PM motors, though the instability arises from different mechanisms.

Figure 6:
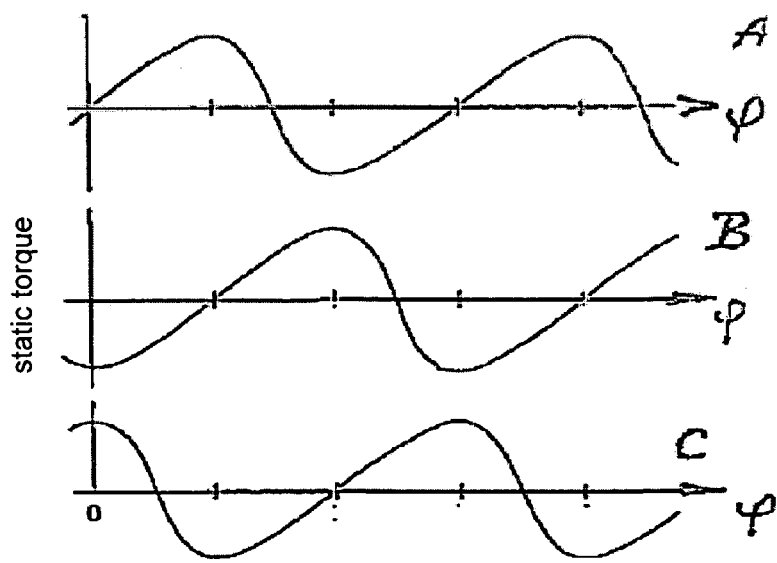
FIG. 6 is a diagram illustrating torque distribution in a three-phase variable reluctance electrical motor.

As discussed above, VR brushless motors have variable distribution of the torque as a function of angle. A typical distribution of the (static) torque versus angle for each the three phases$_w$ in a VR brushless motor is presented in the FIG. 6. These graphs show that each phase (1) exerts a torque on the rotor as function of the angular position of the rotor with respect to the stator, and more significantly (2) that the exerted torque is non-linear with respect to angular position. It is believed that this non-linearity arises from the simultaneous energizing of two or more phases$_w$ resulting in the energized phases$_w$ simultaneously exerting some degree of torque on the rotor.

In an alternate embodiment of the present invention, the motor control logic in the MCU was modified. The modification to the MCU logic produces drive signals so that when the signals are applied to phase A and phase B, the rotor experiences a torque exerted towards phase A that is substantially equal to the torque exerted towards phase B. This allows angular positioning of the rotor between phase A and phase B in a stable manner.

Figure 7:
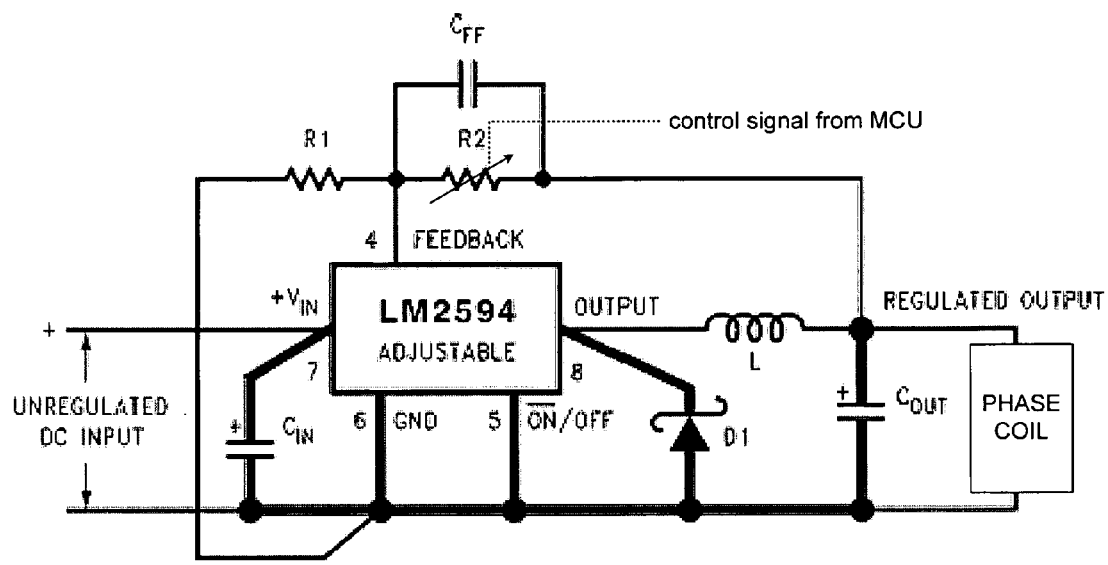
FIG. 7 is an illustrative embodiment of a switching power supply circuit to provide torque equalization in accordance with the present invention.

FIG. 7 shows a coil drive circuit comprising a programmable switching-mode power supply, capable of providing a voltage range from a minimum level of about 1.23V to a nominal maximum voltage level, $V_{max}$. As indicated in the figure, one such coil drive circuit is connected to drive each phase coil comprising the motor. Thus, each phase coil can be independently energized by its corresponding coil drive circuit.

The programmable power supplies were based on the LM2594ADJ switching-mode power supply with a resistor adjustable output, and a AD5290XRMZ10 microcontroller-programmable potentiometer (R2). The electrical schematic of the power supply is shown in FIG. 7. The potentiometer part is manufactured and sold by Analog Devices, Inc.

The internal power supply hardware generates permanent feedback voltage of 1.23V, available on Pin 4. So, the output voltage can be calculated as $$V_{out}=1.23*(1+R2/R1),$$

where R2 is the programmable potentiometer.

The AD5290XRMZ10 is a low cost, compact 2.9 mm×3 mm+30V/±15V, 10 kOhm, 256-position digital potentiometer ("digital pot"). The wiper settings are controllable by through an SPI compatible digital interface. The resistance between the wiper and either end point of the fixed resistor varies linearly with respect to a digital code (value) that is communicated to the digital pot. The values range from 0xFF to 0x00.

Figure 8:
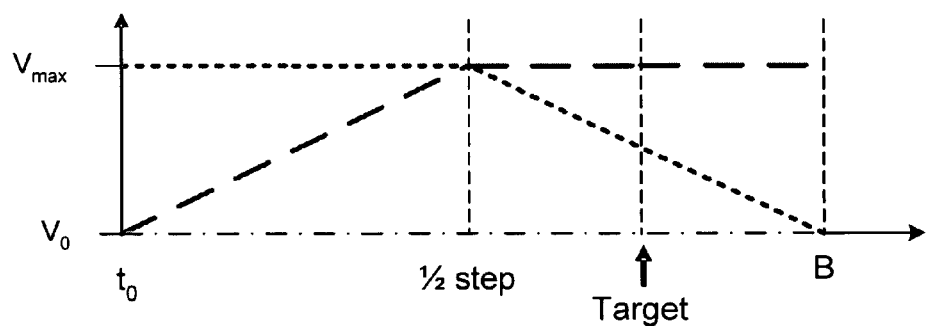
FIGS. 8 and 9 are timing diagrams illustrating the timing of signals for controlling a variable reluctance electrical motor system in accordance with the present invention.

The modified control logic operates as follows: Referring to FIG. 8, we have a 3-phase motor, phase A, phase B, phase C. Assume an initial condition where the rotor is at some initial position with respect to the stator. For example, FIG. 8 shows a plot of codes (digital signals) for operating the digital pots associated with each phase coil versus time. At time $t_0$, a code 0xFF is sent to the digital pot that is associated with phase A, with the digital pots for phases$_w$ B and C being set at 0x00. Thus, at a time $t_0$ the full nominal voltage level ($V_{max}$) is applied to phase A thus energizing phase A with the full nominal voltage, while phases$_w$ B and C substantially at a minimum voltage $V_O$. The position of the rotor at $t_0$ is said to be at phase A.

FIG. 8 also shows a target position located between phase A and B, somewhere beyond the ½ step position. The target position is a desired position as determined by a user (whether a human user, or a machine "user"). The goal is to control the rotor to move it from the current position at phase A to the target position. Based on the target position relative to the reference position (e.g., the position of phase A), the target position signal is high. This means "Forward" rotation.

As long as the current position of the rotor is not located at the target position, there will be an output signal from the Auxiliary Generator (Phase Sensor). The MCU will see positive and negative transitions of the output signal, as discussed above. However, in accordance with the particular disclosed embodiment of the present invention, the MCU reacts only on the negative transition of the output signal from the Auxiliary Generator (Phase Sensor) by incrementally increasing the voltage on phase B. This is accomplished by incrementing the digital signal that drives the digital pot that corresponds to phase B (e.g., the code is incremented from 0x00 to 0x01 to 0x02 and so on) to deliver an incrementally increasing amount of voltage (i.e., from 0V to nominal voltage level) to the phase. Phase C remains off (i.e., the code that drives its digital pot is 0x00). This combination of energizing the phase coils creates a forward rotation of the rotor from the phase A position toward the phase B position; the rotor will smoothly move towards phase B. Eventually, the digital pot for the voltage on phase B reaches nominal (code 0xFF), and the voltage on the phase A remains nominal (code 0xFF). When this occurs, the rotor is positioned exactly in between phases$_w$ A and B (referred to as a ½ step).

As shown in FIG. 8, the microcontroller starts incrementally decreasing the voltage on phase A (e.g., codes 0xFF, 0xFE, 0xFD, 0xFC, and so on are sequentially issued by the MCU to the coil drive circuit corresponding to phase A) while keeping phase B energized at nominal voltage, $V_{max}$. The rotor will continue rotating toward phase B as phase A becomes less energized. If, at this point, the rotor passes the target, and the target position signal becomes low, the microcontroller starts increasing voltage on phase A, while keeping voltage on phase B high (code 0xFF), causing the rotor to move in the opposite direction. At the target position both phases$_w$ exert some degree of pull on the rotor. In particular, the torque exerted on the rotor by phase A is equal but opposite in direction to the torque exerted by phase B, and so the rotor remains still.

Figure 9:
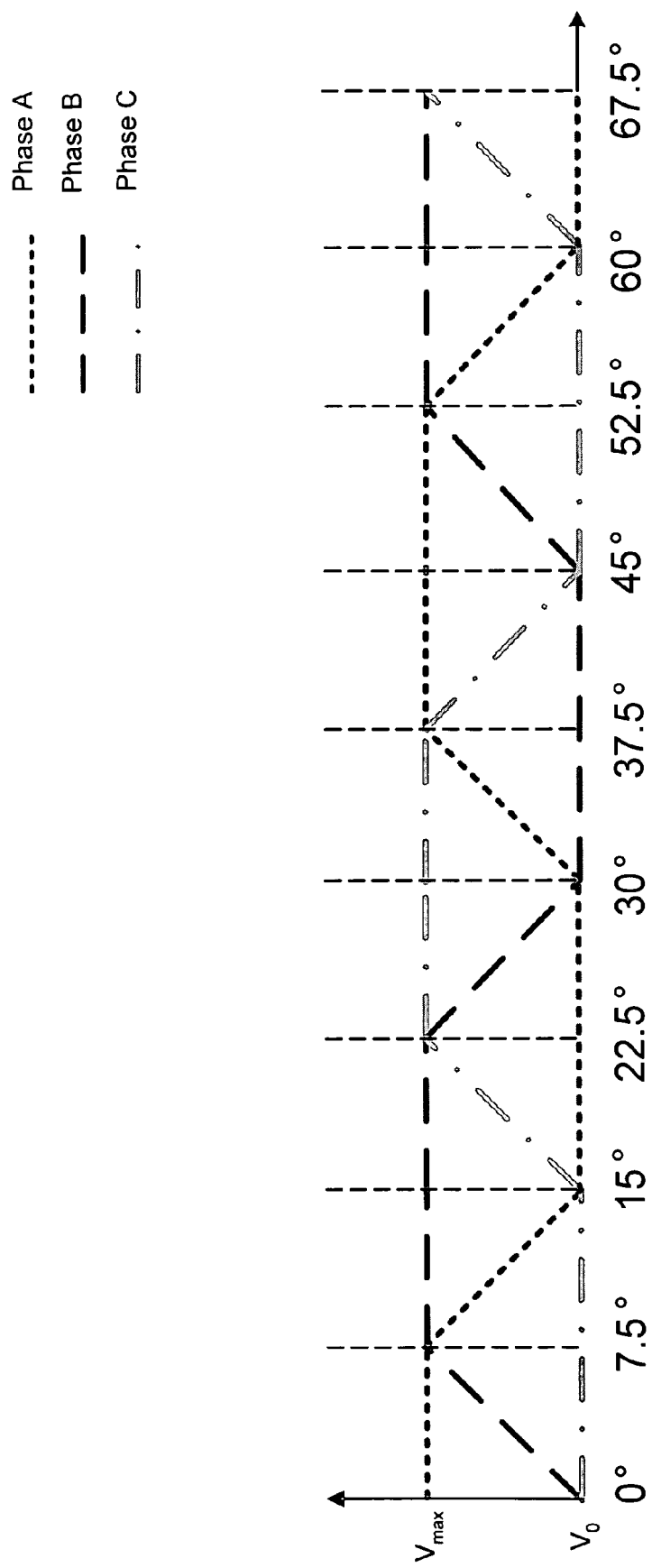

The described algorithm can be used with other phase combinations (AB, BC, CA) to cover all 360 degrees. The waveform presented in FIG. 9 shows the combination of phases that are energized and the amount of energization of the coils to attain any desired position of the rotor. Since the motor has 3 phases$_w$ and a 15° original step, the control signals are repeated every 45°. However, according to the current algorithm, the system switches phases$_w$ without gradually increasing/decreasing voltage until it reaches the target.

Let's assume, the rotor is now in phase A (0°). Phase A is fully energized. As phase B begins to be energized, while keeping phase A high, the rotor begins to move to a position between phase A and phase B (7.5°). When the signal from phase A is taken off, the rotor moves to phase B (15°). As phase C is gradually energized, the rotor will rotate to a position between phases$_w$ B and C (22.5°). The rotor moves to phase C (30°), when the signal on phase B becomes low. The signal on phase A moves the rotor to a halfway between C and A (37.5°), and the sequence completes by switching off phase C, which causes the rotor to move to phase A (45°). Once the target is reached the voltage is increased/decreased gradually as shown in FIG. 8.

CONCLUSION

General concept of creating of the stable states using the method described in the original patent is correct and will result in working devices. Presently, the system has 360 stable states. Current functionality allows a user to choose a number of full spins, direction of rotation, and the target degree. The number of stable steps can be increased with a more powerful microprocessor and more precision phase sensor.

Figure 10:
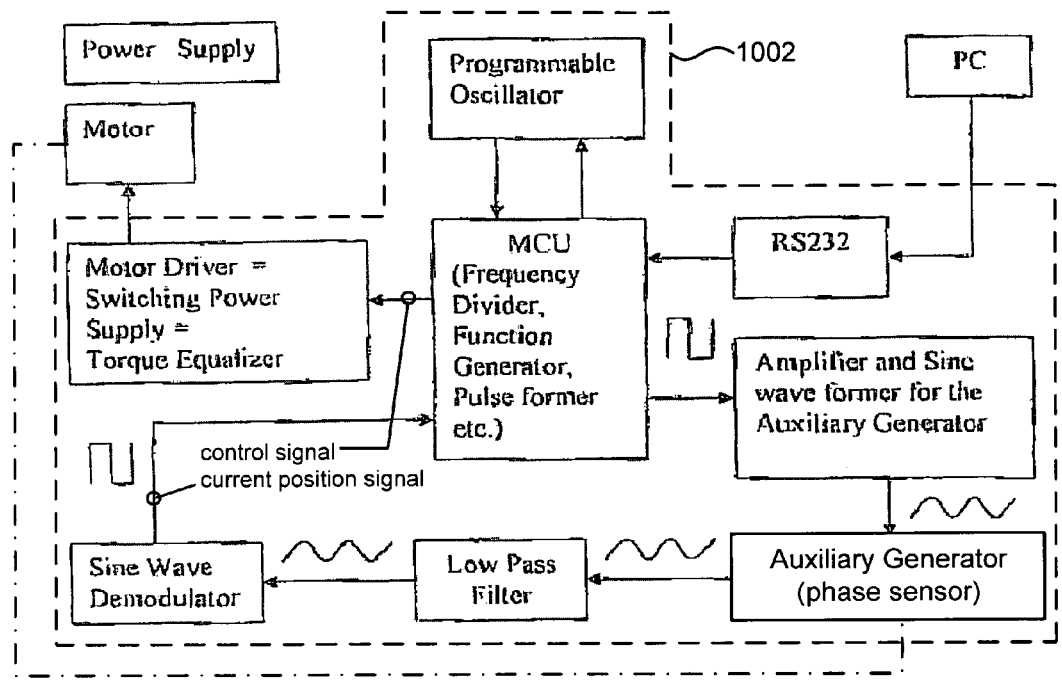
FIG. 10 is a block-diagram illustrating another embodiment of a control system for brushless variable reluctance electrical drives control according to the present invention.

An illustrative embodiment of a controller 1002 according to this aspect of the invention is shown in FIG. 10. Here, the control signal generated by the MCU has a waveform such as shown in the examples of FIGS. 8 and 9. The control signal controls the digital pot (R2) of the coil drive circuit shown in FIG. 7.

Figure 10A:
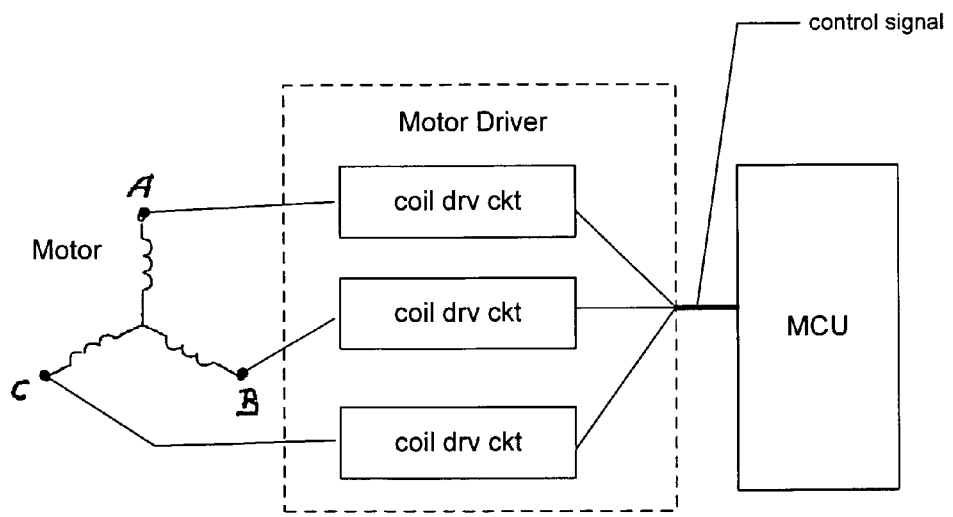
FIG. 10A shows further detail of the Motor Driver shown in FIG. 10.

FIG. 10A shows that the Motor Driver component comprises a coil driver circuit for each coil comprising the Motor. The figure illustrates a three-phase motor as an example, and hence three coil driver circuits. The figure shows that the control signal issued by the MCU can comprise three signals, one signal corresponding to each coil driver circuit. Thus, each constituent signal can be an eight-bit digital signal ranging from 0x00 to 0xFF. For example, the control signal might be a 24-bit data line.

To obtain completely a brushless system we must, in addition to the brushless motor, use a brushless phase sensor as well. This sensor can be an integral (embedded) part of electromechanical device as shown in the illustrative embodiment of FIG. 11. Some approaches for implementing an embedded sensor include:

a. a combination of capacitive coupling and capacitive sensing devices, such as disclosed in U.S. Pat. Nos. 6,101,084 and 5,872,408, both of which are fully incorporated herein by reference for all purposes, or b. a combination of other sensing devices, such as a synchro phase sensor and inductive rotary coupling.

Figure 11:
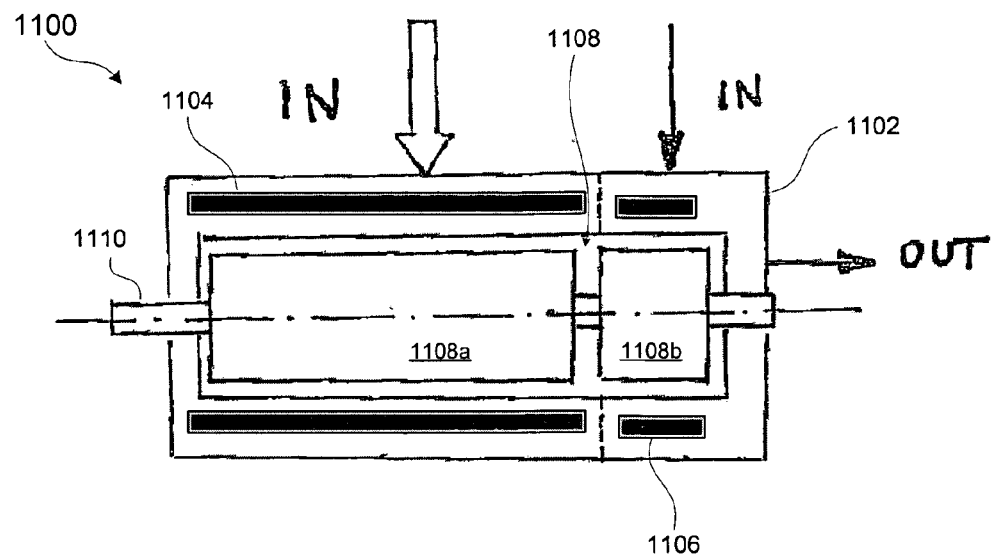
FIG. 11 presents an embodiment of a brushless variable reluctance electrical motor with an integral phase sensor.

Despite being seemingly more complex, the general construction of the device of FIG. 11 can be actually simplified. The reason for this lies in the structural similarities between brushless motors and phase sensors. As it was already stated, the auxiliary generator in a description above is nothing but a phase sensor.

FIG. 11 shows a motor 1100 comprising a motor housing 1102. The motor housing contains a drive coil assembly 1104 and a sensor coil assembly 1106. The motor housing supports a shaft 1110 a rotor 1108 mounted to the shaft. The rotor 1108 comprises a drive portion 1108a and a sensor portion 1108b coupled to the shaft 1110. A first input signal energizes the coils which constitute the drive coil assembly 1104 to provide the motive force/torque for the drive portion 1108a; the drive portion 1108a performs the work. The sensor coil assembly 1106 is driven by a second input signal which serves as the reference signal. The sensor coil assembly 1106 provides a sensor output signal which indicates the position of the sensor portion 1108b of the rotor 1108. Since the drive and sensor portions of the rotor rotate in unison by virtue of its unitary construction, the sensor output signal represents the current position of the motor during its operation.

Technical and Economical Advantages

Using phase as a unified standard information parameter creates numerous potential technical, technological, and, as a final result, economical advantages. Besides some very specific advantages, like being non-incremental and not prone to the accumulation of errors, systems with phase as an information parameter allow creation of a completely new class of electromechanical devices.

An important property of these devices is that many of their parameters, such as number of steps for positioning systems, or speed of rotation for rotational devices, are determined by the controller rather by their mechanical construction. As a result, the entire inventory, for example, of stepping motors can be reduced to just a handful of model that differing only in size and torque, while their number of steps will be application-specific. Technological and economical advantages of such an approach are immediately obvious. Similarly, a wide range of sensors based on different physical principles and different engineering implementations will be replaced with a small inventory of highly efficient, accurate and technological sensors, having a unified output (phase$_s$). Some of these sensors are so simple, that they can be made a standard feature of all electromechanical devices practically without increasing their price.

Further advantages are connected with the possibility to achieve accuracy, resolution and, as a result, number of steps that are either impossible or require extremely complicated constructive solutions in traditional electromechanical systems.

What is claimed is:

1. A controller for a brushless DC motor to control rotor position of said motor comprising:
   first logic configured to receive information indicative of a target angular position of said rotor;
   a sensor operative with said motor to produce a current-position signal representative of a current angular position of said rotor;
   motor drive circuitry operative with said motor to provide a motor drive signal to said motor to operate said motor; and
   control logic configured to produce a motor control signal as an input signal to said motor drive circuitry, said motor control signal being dependent on a phase difference between a target position signal representative of said target angular position and said current-position signal,
   said motor drive signal being generated in response to said motor control signal to energize of group of phase windings comprising said motor, wherein one of said phase windings from among said group of said phase windings is energized to exert a first torque and another phase winding from among said group of phase windings is energized to exert a second torque opposite to said first torque.

2. The controller of claim 1 wherein said control logic is further configured to produce a first drive signal as an input to said sensor, said sensor generating a sensor output signal in response to rotation of said rotor, said current-position signal being produced from said sensor output signal.

3. The controller of claim 1 wherein said control logic is implemented as a microcontroller.

4. The controller of claim 3 wherein said sensor is a phase angular position sensor configured to be rotationally coupled to said rotor.

5. The controller of claim 1 wherein said motor comprises:
   a housing;
   a first coil assembly disposed in said housing;
   a second coil assembly disposed in said housing; and
   a rotor disposed in said housing, said rotor comprising a drive portion operative with said first coil assembly and a sensor portion operative with said second coil assembly.

6. The controller of claim 1 wherein said motor drive circuitry comprises at least a first coil drive circuit operative to produce a coil drive potential to energize one of said phase windings, wherein said drive potential varies gradually from a first voltage potential to a second voltage potential.

7. The controller of claim 1 wherein said motor drive circuitry comprises a first coil drive circuit to energize a first phase winding and a second coil drive circuit operative to produce a coil drive potential to energize a second phase winding, wherein said motor control signal comprises a first signal portion to operate said first coil drive circuit to produce a varying coil drive potential to energize said first phase winding, wherein said motor control signal further comprises a second signal portion to operate said second coil drive circuit to produce a varying coil drive potential to energize said second phase winding.

8. The device of claim 1 wherein said motor is a permanent magnet-type motor, said rotor comprising a plurality of permanent magnet segments.

9. The device of claim 1 wherein said motor is a variable reluctance-type motor, said rotor consisting of ferromagnetic material.

10. A device for controlling angular position of a rotor in a brushless direct current motor comprising:
   an angular position sensor to produce a current position signal indicative of a current angular position of said rotor;
   a reference signal generator coupled to said angular position sensor to provide said angular position sensor with a reference signal, said current position signal being based on said reference signal;
   an input for receiving target position indicative of a target angular position of said rotor, wherein said rotor can
   a control unit configured to produce a target position signal based on said target position and on said reference signal, said control unit further configured to produce control signal based on a phase difference between said target position signal and said current position information signal; and
   a motor drive circuit coupled to receive said control information from said control unit, said motor drive circuit configured to produce a motor drive signal to energize of group of phase windings comprising said motor, wherein one of said phase windings from among said group of said phase windings is energized to exert a first force and another phase winding from among said group of phase windings is energized to exert a second force opposite to said first force.

11. The device of claim 10 wherein said target angular position of said rotor is based on said phase difference between said target position signal and said current position signal.

12. The device of claim 10 wherein said target position signal and said current position signal are square-wave signals, wherein said control information is based on a comparison of a falling edge of said target position signal and a falling edge of said current position signal.

13. The device of claim 10 wherein said motor drive signal comprises constituent signals to energize each of said phase winding independently of one another such that a torque between one phase winding and said rotor and a torque between another phase winding and said rotor are substantially equal.

14. The device of claim 10 wherein said control unit generates a control signal such that said motor drive signal energizes each of said phase windings independently of one another such that a torque between one phase coil and said rotor and a torque between another phase winding and said rotor are substantially equal.

15. The device of claim 10 wherein said position sensor is a constituent component of said motor.

16. The device of claim 10 wherein said motor drive circuit comprises a coil drive circuit having a variable output voltage potential produced in response to said control information.

17. The device of claim 16 wherein said coil drive circuit comprises a digital potentiometer arranged to receive said control information, the resistance of said digital potentiometer being determined by said control information, variable output voltage potential being determined by the resistance of said digital potentiometer.

18. The device of claim 10 wherein said motor is a variable reluctance-type motor, said rotor consisting of ferromagnetic material.

19. The device of claim 10 wherein said motor is a permanent magnet-type motor, said rotor comprising a plurality of permanent magnet segments.

20. Apparatus for controlling a brushless motor comprising a stator having a plurality of stator poles and a rotor, the apparatus comprising:

an input for receiving target angular position information indicative of a target angular position for said rotor;

a position sensor to produce a position information signal indicative of a current angular position of said rotor;

a drive signal generator operatively coupled to said position sensor, said drive signal generator having a motor drive signal output, said motor drive signal output being based on a phase difference between said position information signal and a target position signal produced from said target angular position information;

wherein said motor drive signal output energizes groups of phase coils of said motor to rotate said rotor to said target rotor position, wherein said target rotor position is independent of locations of said stator poles whereby said rotor can be rotated to an angular position independent of said stator pole locations.

21. The apparatus of claim 20 wherein said motor is a variable reluctance-type motor, said rotor consisting of ferromagnetic material.

22. The apparatus of claim 20 wherein said motor is a permanent magnet-type motor, said rotor comprising a plurality of permanent magnet segments.

23. The apparatus of claim 20 wherein angular positions of said rotor are positions between said stator poles.

* * * * *